United States Patent
Bahrami et al.

(10) Patent No.: US 10,698,664 B2
(45) Date of Patent: Jun. 30, 2020

(54) API MASHUP GENERATION

(71) Applicant: FUJITSU LIMITED, Kawasaki-shi, Kanagawa (JP)

(72) Inventors: Mehdi Bahrami, Santa Clara, CA (US); Lei Liu, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/851,734

(22) Filed: Dec. 21, 2017

(65) Prior Publication Data

US 2019/0196796 A1   Jun. 27, 2019

(51) Int. Cl.
| | |
|---|---|
| G06F 9/44 | (2018.01) |
| G06F 8/36 | (2018.01) |
| G06F 9/54 | (2006.01) |
| G06F 8/74 | (2018.01) |
| G06F 8/38 | (2018.01) |
| G06F 16/903 | (2019.01) |
| G06F 8/30 | (2018.01) |

(52) U.S. Cl.
CPC .......... G06F 8/36 (2013.01); G06F 8/30 (2013.01); G06F 8/38 (2013.01); G06F 8/74 (2013.01); G06F 9/54 (2013.01); G06F 16/90344 (2019.01)

(58) Field of Classification Search
CPC ..... G06F 8/36; G06F 8/38; G06F 8/74; G06F 16/90344; G06F 9/54
USPC ....................................................... 717/100
See application file for complete search history.

(56) References Cited

U.S. PATENT DOCUMENTS

| | | | |
|---|---|---|---|
| 6,957,439 B1 * | 10/2005 | Lewallen | G06F 8/51 717/106 |
| 6,981,043 B2 * | 12/2005 | Botz | G06F 21/41 707/999.104 |
| 7,010,796 B1 * | 3/2006 | Strom | G06F 9/547 719/310 |
| 9,141,775 B2 | 9/2015 | Yum | |
| 9,329,878 B2 | 5/2016 | Hong et al. | |
| 9,813,509 B1 * | 11/2017 | Visser | H04L 67/16 |
| 2007/0260571 A1 * | 11/2007 | Mansfield | G06F 17/227 706/48 |

(Continued)

OTHER PUBLICATIONS

Title: A domain-specific language for web apis and services mashups, author: EM Maximillen et al, published on 2007.*

(Continued)

*Primary Examiner* — Chameli Das
(74) *Attorney, Agent, or Firm* — Maschoff Brennan

(57) ABSTRACT

A method may include extracting information regarding a software project based on source code of the software project, where the information includes a description of the source code and computer-readable source code. The method may also include identifying at least two application programming interface (API) calls within the information, and extracting metadata regarding at least one of the APIs from the information. The method may additionally include, using the metadata, analyzing the computer-readable source code to determine a correlation between the two API calls. The method may also include, based on the correlation and using a first of the two API calls, generating computer source code that combines the first API call and an additional API call in an API mashup.

14 Claims, 8 Drawing Sheets

(56) References Cited

U.S. PATENT DOCUMENTS

| | | | | |
|---|---|---|---|---|
| 2009/0063862 | A1* | 3/2009 | Yun | G06F 21/31 713/171 |
| 2009/0158238 | A1* | 6/2009 | Jung | G06F 9/44 717/100 |
| 2010/0017425 | A1* | 1/2010 | Kao | G06F 16/957 707/E17.032 |
| 2011/0055765 | A1* | 3/2011 | Neubrand | H04N 1/00204 715/838 |
| 2011/0153590 | A1* | 6/2011 | Chang | G06F 16/958 707/711 |
| 2012/0311548 | A1* | 12/2012 | Ko | G06F 8/70 717/140 |
| 2013/0054630 | A1* | 2/2013 | Briggs | G06F 17/30389 707/760 |
| 2013/0212147 | A1* | 8/2013 | Kim | G06F 16/972 709/201 |
| 2015/0212865 | A1* | 7/2015 | Hong | G06F 3/048 719/328 |
| 2016/0125042 | A1* | 5/2016 | Laredo | G06F 16/2455 707/723 |
| 2017/0097831 | A1* | 4/2017 | Gopshtein | G06F 8/38 |
| 2017/0102925 | A1* | 4/2017 | Ali | G06F 8/36 |
| 2017/0277756 | A1* | 9/2017 | Masuda | G06F 9/5072 |
| 2017/0315789 | A1* | 11/2017 | Lam | G06F 3/04847 |
| 2017/0337052 | A1* | 11/2017 | Elkabany | G06F 8/71 |
| 2018/0062858 | A1* | 3/2018 | Xu | H04L 9/3247 |
| 2018/0121226 | A1* | 5/2018 | Liu | H04L 41/12 |
| 2018/0165135 | A1* | 6/2018 | Bahrami | G06F 9/541 |
| 2018/0203746 | A1* | 7/2018 | Lincoln | G06F 9/541 |
| 2018/0278471 | A1* | 9/2018 | Burli | G06F 8/31 |
| 2018/0284975 | A1* | 10/2018 | Carrier | G06F 3/04847 |
| 2018/0309819 | A1* | 10/2018 | Thompson | G06F 9/547 |
| 2019/0073373 | A1* | 3/2019 | Surale | H04L 63/0428 |

OTHER PUBLICATIONS

Title: Web API Creation for Enterprise Mashup author: M Tanaka published on 2011.*
Pending U.S. Appl. No. 15/727,540, filed Oct. 6, 2017.
Pending U.S. Appl. No. 15/641,196, filed Jul. 3, 2017.

* cited by examiner

API MASHUP GENERATION

FIELD

The embodiments discussed in the present disclosure are related to generation of an application programming interface (API) mashup, and in particular, to generation of an API mashup based on processing of source code of a software project.

BACKGROUND

Some software developers have prepared APIs by which third party computing devices may call a particular functionality at a given location. Some software developers invoke a combination of APIs at a given location. In response to sending such an API call, a response is provided to the third party computing device.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes extracting information regarding a software project based on source code of the software project, where the information includes a description of the source code and computer-readable source code. The method may also include identifying at least two application programming interface (API) calls within the information, and extracting metadata regarding at least one of the APIs from the information. The method may additionally include, using the metadata, analyzing the computer-readable source code to determine a correlation between the two API calls. The method may also include, based on the correlation and using a first of the two API calls, generating computer source code that combines the first API call and an additional API call in an API mashup.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to, inter alia, the use of a computing device to analyze various software projects that utilize API calls in the software projects to identify correlations between API calls. For example, an API mashup generator may identify that the output of one API call in a first software project is provided as the input of another API call in a second software project. The API mashup generator may combine the code used to implement the two API calls in the two software projects into a single set of computer source code for implementing an API mashup that utilizes both APIs.

The generation of an API mashup from an API document may provide a number of benefits to the operation of a computer itself, and improvements to the related field of computer programming. With respect to the computer itself, the generation of the API specification may provide the computer with improved functionality by allowing the computer to invoke and/or implement new functionality that has not existed before, and to generate such functionality in an automated manner. For example, the present disclosure may facilitate the combination of multiple APIs, each with distinct functionalities, and generate new computer source code to implement the new combined functionality. Thus, embodiments of the present disclosure may improve the performance of a computer itself.

With respect to improving computer programming, the present disclosure may provide enhanced capabilities and generation of computer source code. For example, the present disclosure may facilitate the generation of a new combination of computer source code in a manner that provides new functionality. Thus, embodiments of the present disclosure may improve the computer programming.

Embodiments of the present disclosure are explained with reference to the accompanying drawings.

Figure 1:
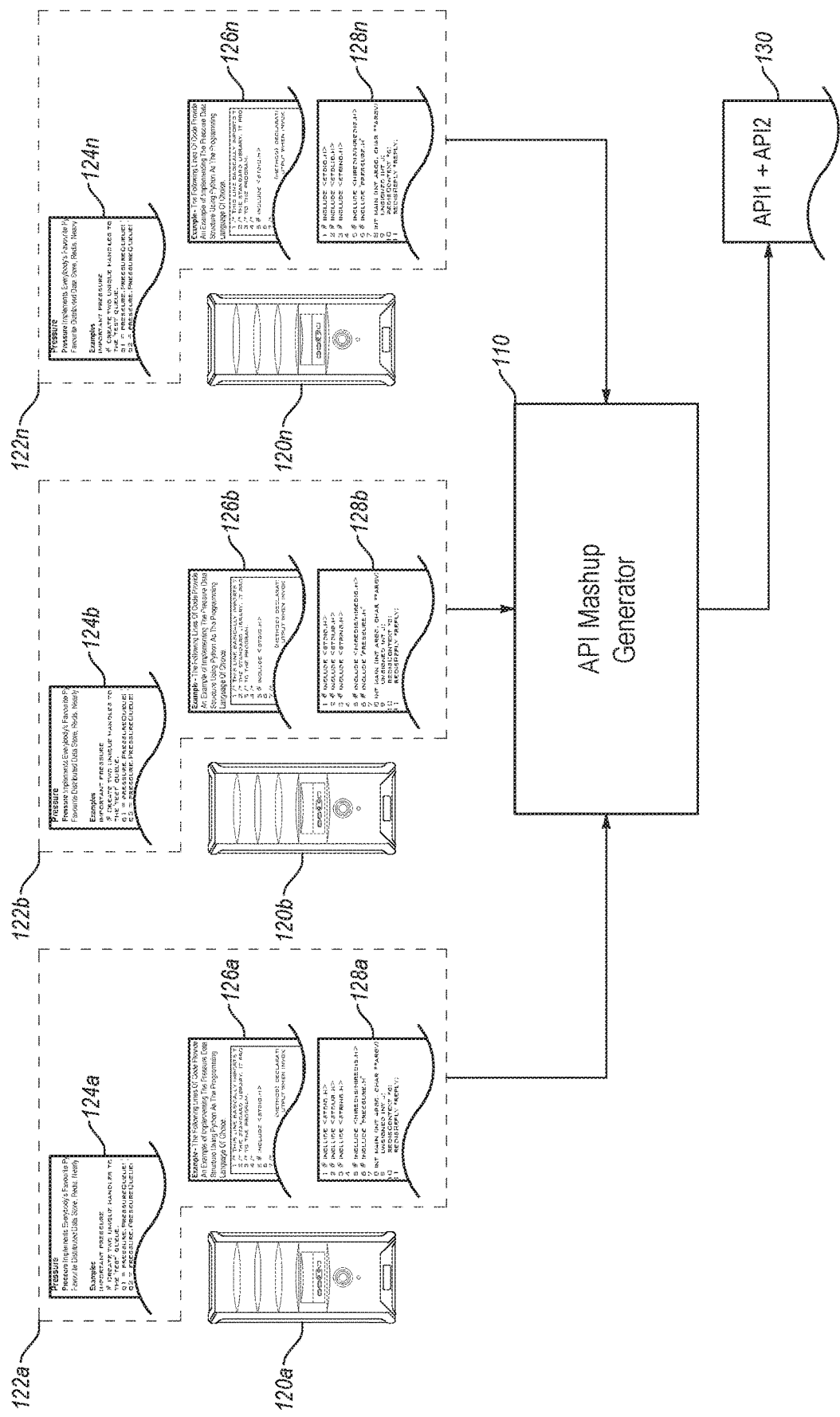
FIG. 1 illustrates an example system related to generating an API mashup.

FIG. 1 illustrates an example system 100 related to generating an API mashup, in accordance with one or more embodiments of the present disclosure. The system 100 may include a mashup generator 110 configured to obtain information regarding one or more software projects 122 (such as the software projects 122a, 122b, . . . , 122n). In some embodiments the software projects 122a, 122b, and 122n may be stored in project servers 120, such as the project servers 120a, 120b, and 120n, respectively. The software projects may be available publicly (e.g., open-source projects) or privately to authorized users and applications. The software projects 122 may provide a set of functionality as implemented by computer source code. In these and other embodiments, the software projects 122 may include any of a description 124 of the software projects 122, snippets of code 126 used in the software project 122, and the actual computer source code 128 for implementing the software project 122. By analyzing the software projects 122a, 122b, . . . , 122n, the API mashup generator 110 may determine correlations between two or more APIs and produce computer source code involving at least one of the APIs in the API mashup. As used herein, the term API mashup may refer to a set of computer source code that include API calls to two or more APIs in a way that the output of one or more APIs is used as input for another API.

In some embodiments, processing occurs on the output of one API in the API mashup 130 before being used as the input for another API.

The API mashup generator 110 may be a system, device, component, or combinations thereof configured to extract information regarding one or more software projects 122, determine correlations between one or more APIs of the software projects 122, and generating the API mashup 130 based on the correlations between the APIs. The API mashup generator may be implemented as a computing device, such as the computing device 800 of FIG. 8, a software process or processes operating on such a computing device, etc. For example, based on detected correlations, the API mashup generator 110 may include computer source code that includes a first API call, optionally some processing on the output of the first API, and a second API call on the output (or processed output) of the first API. For example, the first API may be an emotion API configured to receive as input an image and return an array of emotions with probabilities of the array of emotions being the emotion illustrated in the image. The output of the emotion API may undergo some processing to identify the highest probability emotion. The highest probability emotion may be fed into a music search API that searches for songs or playlists based on an emotion. By combining the functionality of both the emotion and the music search APIs, an API mashup may be achieved.

In some embodiments, the API mashup generator 110 may be configured to obtain information regarding the software project 122a. For example, the API mashup generator may download, crawl, or otherwise access the software project 122a as stored in the project server 120a. In these and other embodiments, the API mashup generator may extract information from one or more websites of the software project 122a. For example, the API mashup generator 110 may extract pages with the description 124a, pages that may include the snippets 126a, and/or a page that may include the code 128a.

In some embodiments, the API mashup generator 110 may analyze the extracted information to identify API calls within the software project 122a. For example, the API mashup generator 110 may parse the description 124a searching for the term "API" or synonymous terms (e.g., "Application Programming Interface," "Third Party Function," "Third Party Resources," "Third Party Application Call," etc.). Additionally or alternatively, such terms may be identified in association with the snippet 126a and/or the code 128a. In some embodiments, the snippet 126a and/or the code 128a may be parsed or otherwise searched for a given hypertext transfer protocol (HTTP) function in proximity to a uniform resource locator (URL) or uniform resource identifier (URI). For example, the API mashup generator 110 may search for a PUSH, POST, DELETE, PUT, etc. HTTP command proximate a URL or a URI, and may identify the combination as an API call.

In some embodiments, the API mashup generator 110 may be configured to determine whether the API call identified in the software project 122a is associated with the introduction of a new API or the use of a preexisting API. For example, the API mashup generator 110 may compare the API call to a list of known APIs, or may search the description 124a or the code 128a for terms indicative of introducing a new API. For new APIs, the API mashup generator 110 may recognize that software projects introducing new APIs are unlikely to include the use of the new APIs with other APIs.

In some embodiments, the API mashup generator 110 may extract metadata regarding the identified API calls. For example, the API mashup generator may extract, from the description 124a, the API title, the API URL/URI, the API host, any examples of usage of the API, an installation guide for the API, any dependencies of the API (e.g., other functions/APIs that the API relies upon, etc.). In some embodiments, the API mashup generator 110 may extract the metadata for both newly introduced and already existing APIs. In these and other embodiments, the API metadata of the identified APIs may be used by the API mashup generator 110 to generate the API mashup 130. An example of extracting metadata may be described in greater detail with reference to FIG. 6.

In some embodiments, the API mashup generator 110 may analyze the code 128a of the software project 122a associated with the API call to determine potential applications of API mashups. In some embodiments, for software projects introducing new APIs, the API mashup generator 110 may not analyze the code and may store the metadata in the event that a future analyzed software project includes the API in a manner that permits identification of potential mashups with the newly introduced API. In analyzing the code 128a, the API mashup generator 110 may determine a programming language used in the identified API call. For example, the API mashup generator 110 may identify that the API call is in Python, C #, C++, etc. In these and other embodiments, the API mashup generator 110 may identify a particular syntax of code as associated with one language or another. Additionally or alternatively, the API mashup generator 110 may be configured to identify a similar or comparable API call from one language in another language. For example, the API mashup generator 110 may be configured to identify lines of code in the Python programming language as invoking an API call, and may identify comparable lines of code for invoking an API call in C++.

In some embodiments, in analyzing the code 128a, the API mashup generator 110 may extract variables from the code 128a. The API mashup generator 110 may be configured to identify the type of variables (e.g., string, float, Unicode, etc.) and relationships between the variables (e.g., code that 'a=b' includes a relationship between 'a' and 'b' in that the value of variable 'b' is transferred to variable 'a'). In these and other embodiments, the different variable types and the different relationships may be dependent on the programming language used to generate the code 128a. The relationships may be depicted visually to identify relationships between variables, such as using a unified modeling language (UML).

Analyzing the code 128a by the API mashup generator 110 may additionally include identifying usages for the API calls in the code 128a based on the types and relationships of the variables used in the code 128a. For example, the API mashup generator 110 may determine what code is used to invoke the API and/or what variables are used as inputs and/or outputs of the API. The API mashup generator 110 may additionally or alternatively identify processing that occurs on an input and/or on an output of the API. In these and other embodiments, for the code 128a, the API mashup generator 110 may determine whether there are two or more variables used as direct inputs and/or outputs to APIs in the code 128a. If there are two or more such variables, the API mashup generator 110 may further analyze the software project 122a for potential API mashups. An example of analyzing code may be described in greater detail with reference to FIG. 7.

In some embodiments, the API mashup generator 110 may analyze the code 128a around and variable relationships of the API calls to determine correlations between API calls that may facilitate an API mashup. For example, the API mashup generator 110 may determine that two API calls may be combined into a single variable. For example:

$$a=b+c$$

where b and c are API calls. As another example, the API mashup generator 110 may determine that two API calls may be combined after processing on one or both of the outputs. For example:

$$K=b$$

$$L=c$$

$$X=K+$$

$$Y=L+1$$

$$Z=X+Y$$

where b and c are API calls, and the +1 operation is an example of processing the value of an API call on both b and c variables. In both examples above, the API mashup generator 110 may generate the API mashup 130 as the combination of the API calls b and c.

In some embodiments, the API mashup generator 110 may identify additional potential API mashups and may generate computer source code to implement the API mashups. For example, the API mashup generator 110 may identify that the software project 122*a* uses a first API, performs processing on the output of the first API, and provides the processed output as an input to a second API. The API mashup generator 110 may also identify that the software project 122*b* uses the second API, performs processing on the output of the second API, and provides the processed output as an input to a third API. Following the example above, the API mashup generator 110 may generate the API mashup 130 by combining the portions of the code 128*a* from the software project 122*a* associated with calling the first API and performing processing on the output of the first API, with the portions of the code 128*b* from the software project 122*b* associated with calling the second API (using the processed output of the first API from the software project 122*a* as the input to the second API), performing processing on the output of the second API, and calling the third API. Stated mathematically:

$$API1 \rightarrow f1(output1) \rightarrow API2 \text{ from Project1}$$

$$API2 \rightarrow f2(output2) \rightarrow API3 \text{ from Project2}$$

$$Mashup=API \rightarrow f1(output1) \rightarrow API2 \rightarrow f2(output2) \rightarrow API3$$

where API1, API2, and API3 are API calls, f1 and f2 are processing, output1 is the output of API1 and output2 is the output of API2, and Project1 and Project2 are different software projects. An example of the generation of such an API mashup may be described with reference to FIG. 3.

As another example of identifying correlations leading to other potential mashups, the API mashup generator 110 may identify that the software project 122*a* may use a particular type of input to a first API call (e.g., a temperature value as an input to the first API call). The API mashup generator 110 may also identify that the software project 122*b* may call a second API with a temperature value as the output of the second API call. Following the example above, the API mashup generator 110 may generate the API mashup 130 as the portions of the code 122*b* that call the second API and the portions of the code of the software project 122*b* associated with the first API call such that the output of the second API call may be provided directly as an input to the first API call. In these and other embodiments, the software project 122*a* and the software project 122*b* may be coded using different programming languages and the API mashup generator 110 may be configured to convert the API calls from one programming language into the other such that the API mashup 130 may be in a single language. Stated mathematically:

$$input1 \rightarrow API1 \text{ from Project1}$$

$$API2 \rightarrow input1 \text{ from Project2}$$

$$Mashup=API2 \rightarrow input1 \rightarrow API1$$

where API1 and API2 are API calls, and input 1 is the input of API1, and Project1 and Project2 are different software projects. An example of the generation of such an API mashup may be described with reference to FIG. 4.

As an additional example of identifying correlations leading to other potential mashups, the API mashup generator 110 may identify that the software project 122*a* uses a first API, performs a first set of processing on the output of the first API, and provides the processed output as an input to a second API. The API mashup generator 110 may also identify that the software project 122*b* uses a third API, performs a second set of processing on the output of the third API, and provides the processed output as an input to the second API. Because the output of the first API subject to the first set of processing and the output of the third API subject to the second set of processing are both used as inputs to the same function (or endpoint) of the second API, the API mashup generator 110 may recognize the connection as a potential for generating an additional mashup. For example, the API mashup generator 110 may identify that the software project 122*n* uses the first API, performs a third set of processing on the output, and provides the processed output as an input to a function (or endpoint) of a fourth API. The API mashup generator 110 may determine differences between the third set of processing and the first set of processing, and may apply those differences to the second set of processing to derive a fourth set of processing. The API mashup generator 110 may generate the API mashup 130 using the third API, performing the fourth set of processing on the output of the third API, and providing the processed output to the function (or endpoint) of the fourth API. Stated mathematically:

$$API1 \rightarrow f1(output1) \rightarrow API2 \text{ from Project1}$$

$$API3 \rightarrow f2(output2) \rightarrow API2 \text{ from Project2}$$

$$API1 \rightarrow f3(output1) \rightarrow API4 \text{ from Project3}$$

$$f4=f3(\ )-f(\ ) \text{ applied to } f2$$

$$Mashup=API3 \rightarrow f4(output2) \rightarrow API4$$

where API1, API2, API3, and API4 are API calls, f1, f2, f3, and f4 are processing, output1 is the output of API1 and output2 is the output of API2, and Project1, Project2, and Project3 are different software projects. An example of the generation of such an API mashup may be described with reference to FIG. 5.

In each of the preceding examples of identifying a correlation and/or generating the API mashup 130, the different software projects (e.g., Project1, Project2, and/or Project3) may be coded using different programming languages. In such an embodiment, the API mashup generator 110 may be configured to convert the API calls and/or the processing from one programming language to another programming language such that the API mashup 130 includes code in a single language.

Modifications, additions, or omissions may be made to the system 100 without departing from the scope of the present disclosure. For example, the system 100 may include any number of software projects stored on any number of project servers. In some embodiments, a much larger number of software projects may be included.

For each of the methods illustrated in FIGS. 2-7, the methods may be performed by any suitable system, apparatus, or device. For example, the API mashup generator 110 of FIG. 1, or other systems or devices may perform one or more of the operations associated with the methods. Although illustrated with discrete blocks, the steps and operations associated with one or more of the blocks of the methods may be divided into additional blocks, combined into fewer blocks, or eliminated, depending on the desired implementation.

Additionally, for each of the methods illustrated in FIGS. 2-7, modifications, additions, or omissions may be made to the methods without departing from the scope of the present disclosure. For example, the operations of the methods may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 2:
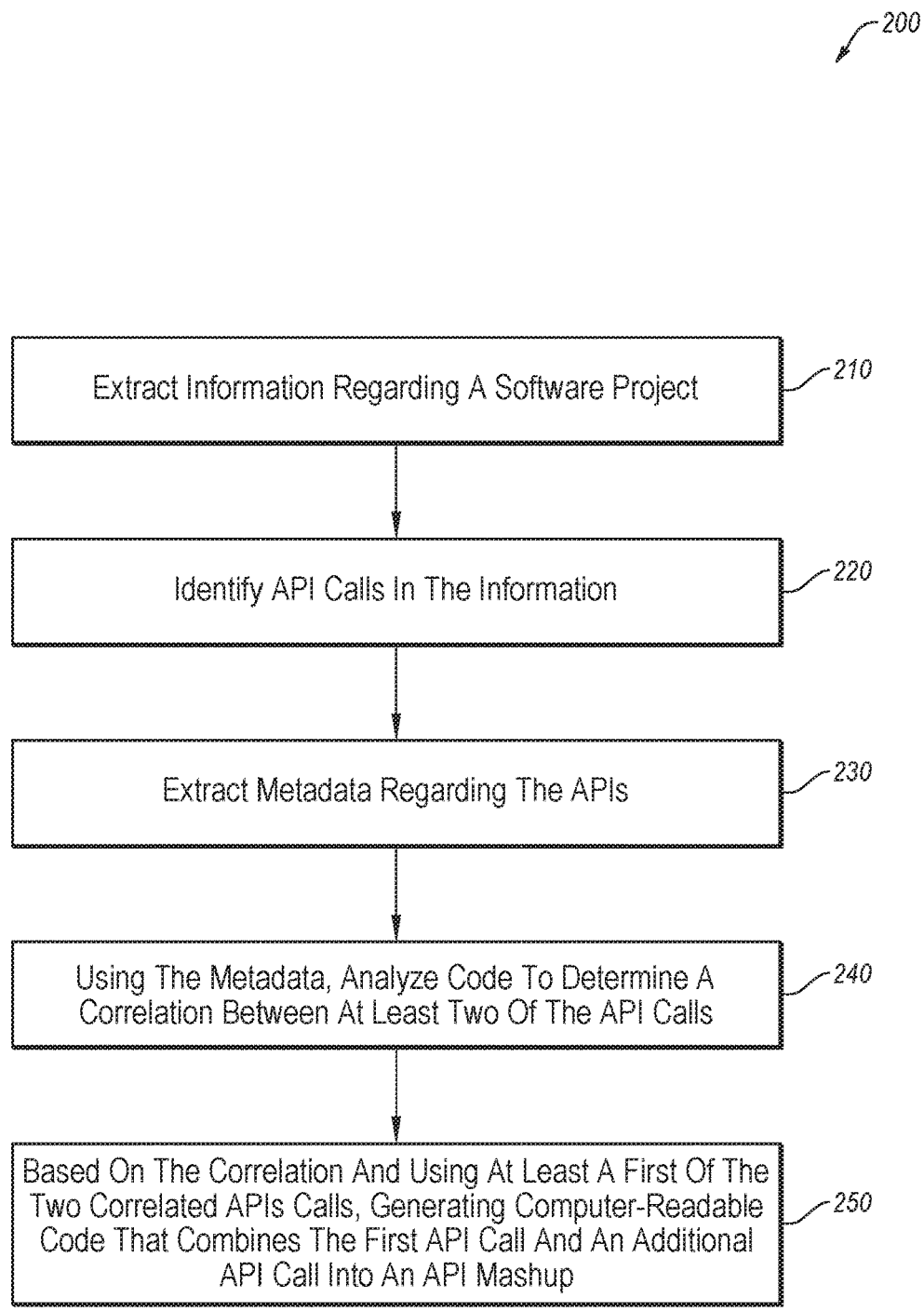
FIG. 2 illustrates a flowchart of an example method of generating an API mashup.

FIG. 2 illustrates a flowchart of an example method 200 of generating an API mashup, in accordance with one or more embodiments of the present disclosure.

At block 210, information regarding a software project may be extracted. For example, an API mashup generator (such as the API mashup generator 110 of FIG. 1) may be configured to identify a website (or multiple websites) for a software project and may crawl, download a local copy of, or otherwise extract information regarding the software project. The extracted information may include any of a plain text description of the software project (e.g., the functionality of the software project, the inputs/outputs of the software project, etc.), snippets of code of the project (e.g., potentially nested within the description with accompanying description of the function of the snippets of code), and code for implementing the software project. In some embodiments, the block 210 may be repeated multiple times across multiple software projects.

At block 220, API calls in the extracted information may be identified. For example, the API mashup generator may parse the extracted information to identify API calls. For example, the API mashup generator may search for the term "API" or for synonymous terms in the description or snippets of code. Additionally or alternatively, the API mashup generator may search the code for lines of code known to implement an API call in a given programming language (such as a certain HTTP command proximate a URL or a URI). In some embodiments, if the API call is identified in the document or snippets of code, the API mashup generator may locate the identified API call in the code.

Figure 6:
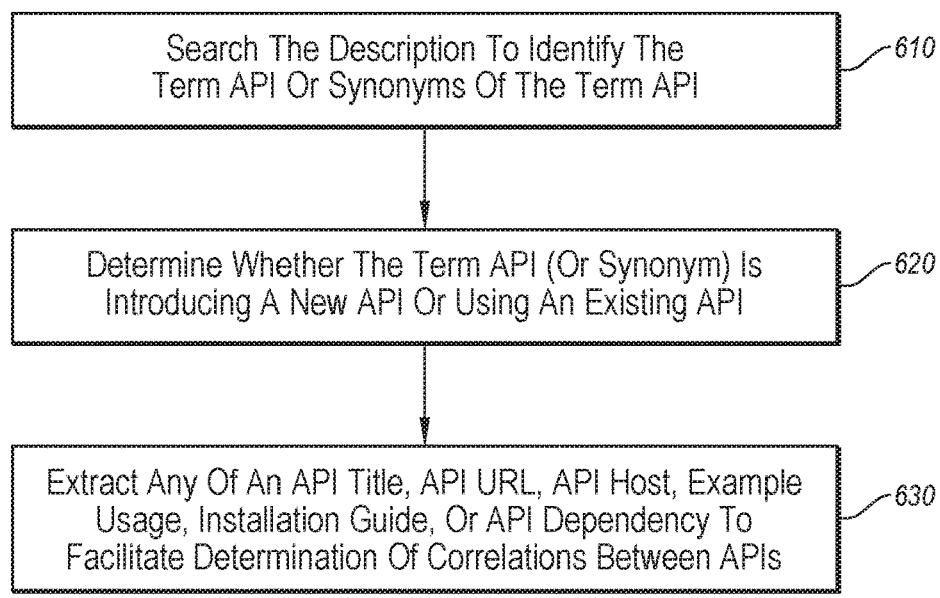
FIG. 6 illustrates a flowchart of an example method of extracting metadata regarding an API.

At block 230, metadata regarding the API call may be extracted. For example, the API mashup generator may parse the information around the API call to identify various pieces of information regarding the API call. For example, the API mashup generator may extract metadata such as a title of the API being called, the URL or URI of the API call, the network system hosting the API, example usages of the API, an installation guide for the API, API dependency between the API and another API, etc. FIG. 6 may provide an example implementation of the blocks 220 and/or 230.

At block 240, using the metadata, the code may be analyzed to determine a correlation between at least two of the API calls. For example, the API mashup generator may analyze inputs and outputs of the various APIs, and identify overlap or other interactions between the inputs and outputs of the various APIs. In some embodiments, the same APIs and/or the same inputs or outputs may be used in different software projects such that APIs from different software projects may be combined in an API mashup. In some embodiments, the identified correlations may be a correlation between two APIs in the same software project. Additionally or alternatively, correlations may be identified between two APIs in different software projects. Such correlations may include processing that occurs on an input and/or an output of one API before being used by another API.

At block 250, based on the correlation of the block 240 and using at least a first of the two API calls identified as being correlated in the block 240, computer source code for an API mashup may be generated that combines the first API call and an additional API call. For example, the API mashup generator may utilize at least one of the API calls in the correlation and another API either from the correlation or related to the correlation. Various examples of such mashups are described above, and the implementation of the blocks 240 and 250 may be described in greater detail with reference to FIGS. 3-5.

Figure 3:
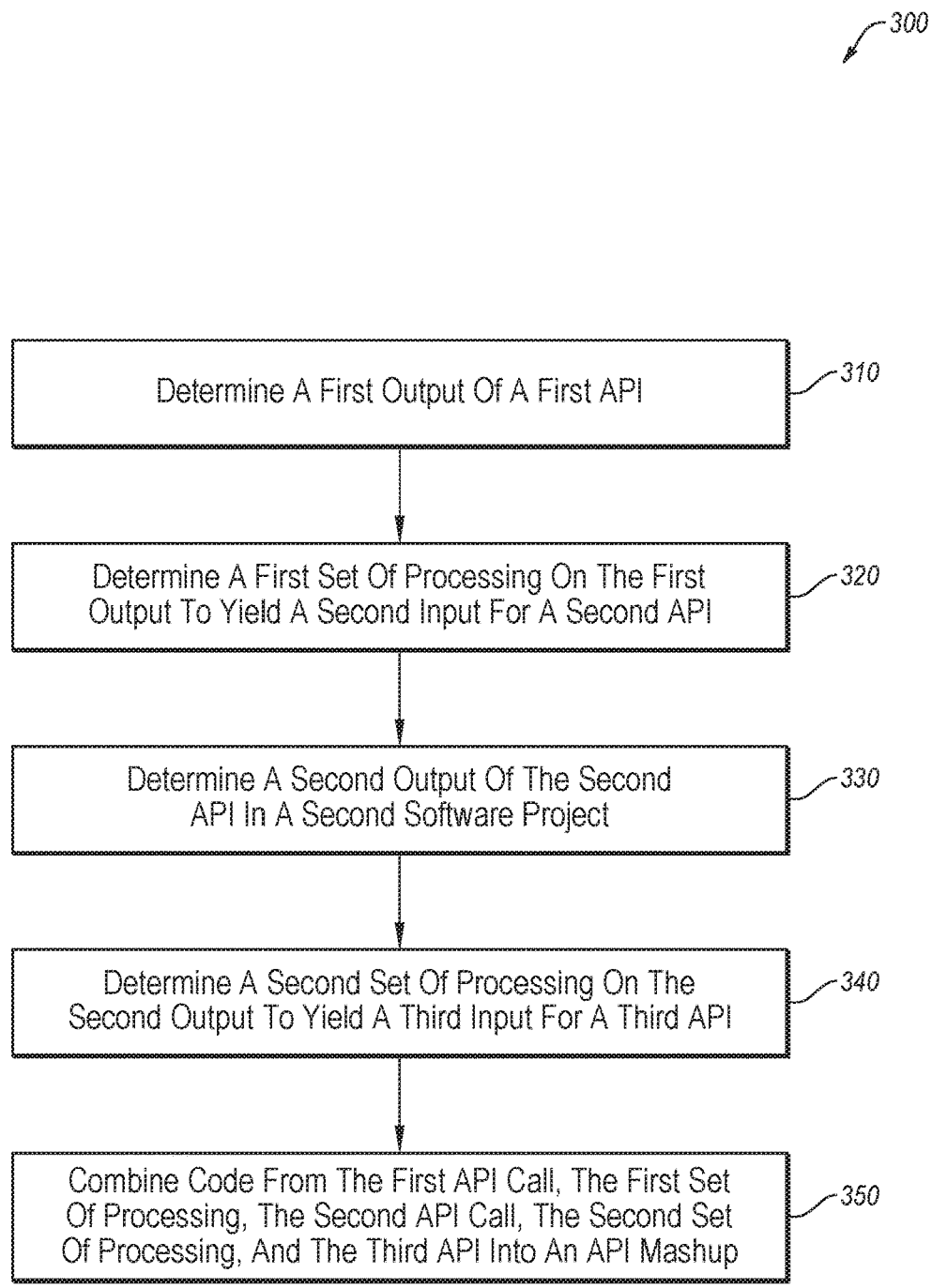
FIG. 3 illustrates a flowchart of another example method of generating an API mashup.
Figure 4:
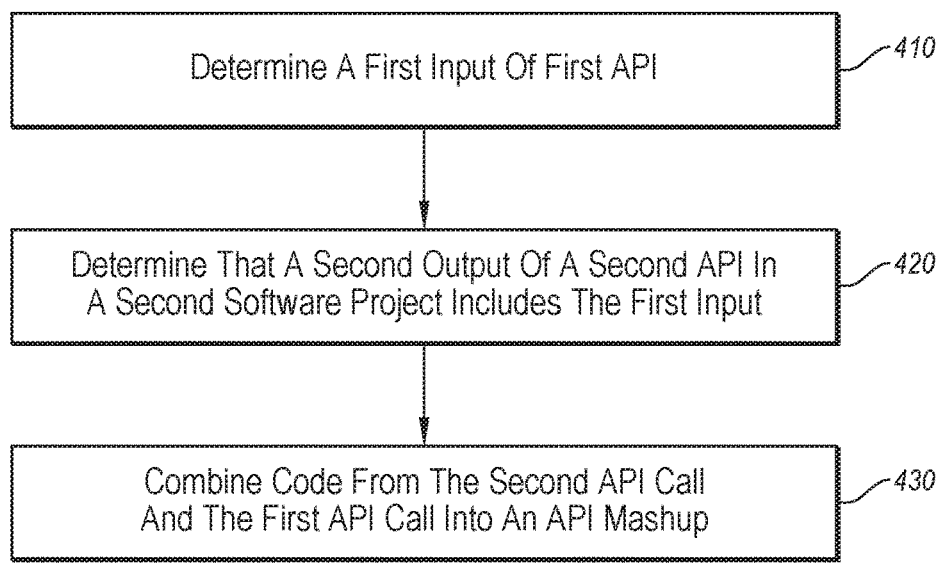
FIG. 4 illustrates a flowchart of an additional example method of generating an API mashup.
Figure 5:
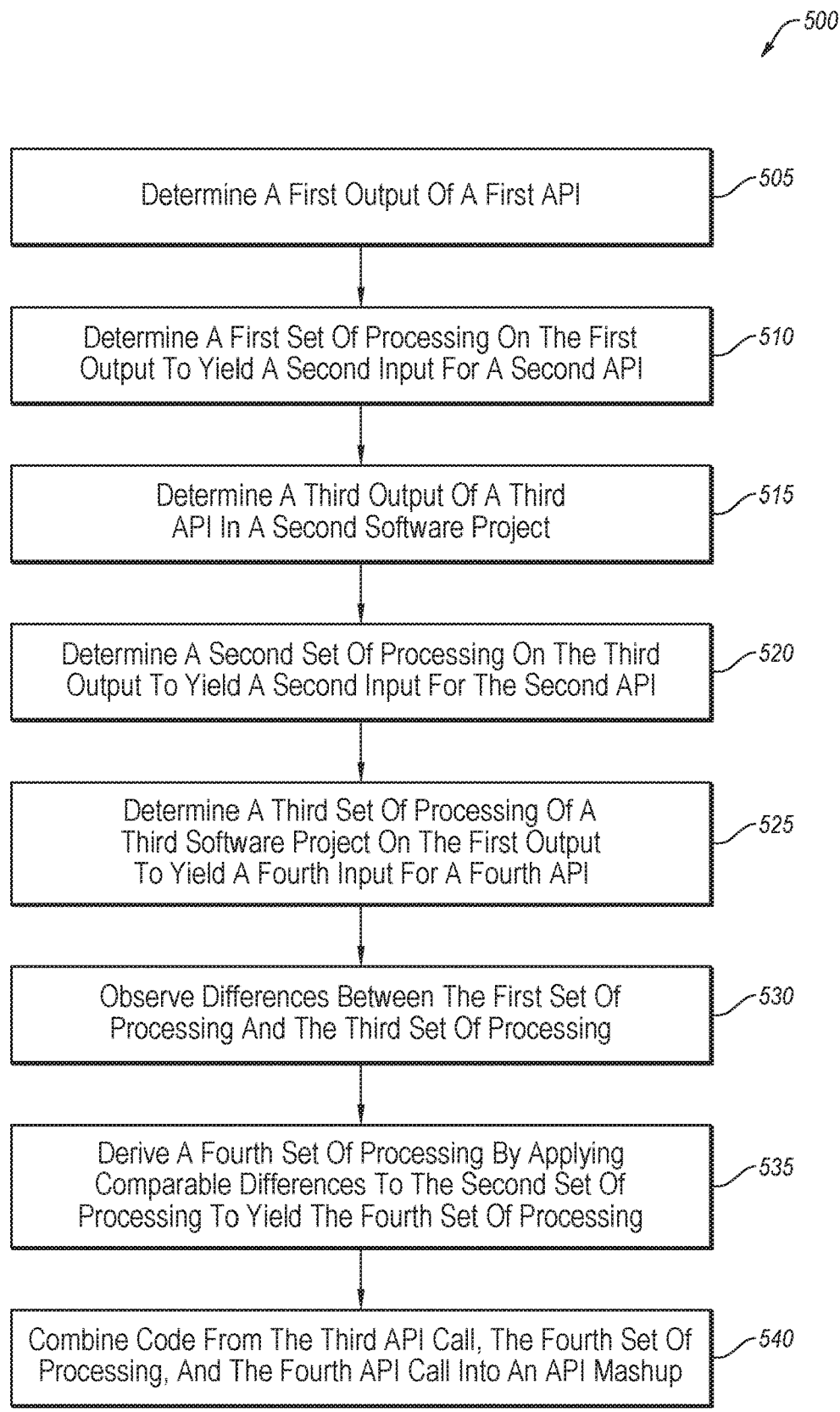
FIG. 5 illustrates a flowchart of another example method of generating an API mashup.

FIGS. 3-5 may illustrate various examples of methods of identifying correlations between APIs that may be utilized to generate an API mashup. Each of the methods of FIGS. 3-5 may generate computer source code such that a computing device may execute the computer source code generated in the methods of FIGS. 3-5 to invoke the described API mashups.

FIG. 3 illustrates a flowchart of another example method 300 of generating an API mashup, in accordance with one or more embodiments of the present disclosure.

At block 310, a first output of a first API may be determined. For example, an API mashup generator (such as the API mashup generator 110 of FIG. 1) may analyze an API and/or the metadata of an API from a first software project to determine what data type or format is output by the first API.

At block 320, a first set of processing performed on the first output to yield a second input for a second API is determined. For example, the API mashup generator may analyze the code from the first software project between the first API and the second API to determine what processing is performed on the output of the first API before being provided as the input to the second API.

At block 330, a second output of the second API in a second software project may be determined. For example, the API mashup generator may determine that the second API is used in a second software project and returns a second output.

At block 340, a second set of processing performed on the second output to yield a third input for a third API is determined. For example, the API mashup generator may analyze the code from the second software project between the second API and the third API to determine what processing is performed on the output of the second API before being provided as the input to the third API.

At block 350, code from the first API call, the first set of processing, the second API call, the second set of processing, and the third API call may be combined into an API mashup. In these and other embodiments, the API mashup generator may convert the code from one software project into the programming language of the other software project such that the code of the API mashup is in a single programming language.

FIG. 4 illustrates a flowchart of an additional example method 400 of generating an API mashup, in accordance with one or more embodiments of the present disclosure.

At block 410, a first input of a first API may be determined. For example, an API mashup generator (such as the API mashup generator 110 of FIG. 1) may analyze an API and/or the metadata of an API from a first software project to determine what data type or format is used as the first input by the first API.

At block 420, a determination may be made that a second output of a second API in a second software project may include the first input of the block 410. For example, the API mashup generator may determine that a second API used in a second software project may return as the second output the first input of the block 410. For example, the second output maybe of the same data type, data format, etc. of the first input.

At block 430, code from the second API call from the second software project and code from the first API call from the first software project may be combined into an API mashup. For example, the API mashup generator may position the code such that the output from the second API call may be provided to the first API call in a single process.

FIG. 5 illustrates a flowchart of another example method 500 of generating an API mashup, in accordance with one or more embodiments of the present disclosure.

At block 505, a first output of a first API may be determined. For example, an API mashup generator (such as the API mashup generator 110 of FIG. 1) may analyze an API and/or the metadata of an API from a first software project to determine what data type or format is returned as the first output by the first API.

At block 510, a first set of processing performed on the first output to yield a second input for a second API in the first software project is determined. For example, the API mashup generator may analyze the code from the first software project between the first API and the second API to determine what processing is performed on the output of the first API before being provided as the input to the second API.

At block 515, a third output of a third API in a second software project may be determined. For example, the API mashup generator may analyze an API and/or the metadata of an API from the third software project to determine what data type or format is returned as the third output by the third API.

At block 520, a second set of processing performed on the third output to yield a second input for the second API in the second software project is determined. For example, the API mashup generator may analyze the code from the second software project between the third API and the second API to determine what processing is performed on the output of the third API before being provided as the input to the second API.

At block 525, a third set of processing performed on the first output of the first API to yield a fourth input for a fourth API in a third software project is determined. For example, the API mashup generator may analyze the code from the third software project between the first API and the fourth API to determine what processing is performed on the output of the first API before being provided as the input to the fourth API.

At block 530, differences between the first set of processing and the third set of processing may be observed. For example, the API mashup generator may parse the code for the first set of processing and the code from the third set of processing to determine differences between the two sets of processing. The differences may be indicative of changes between the input for the fourth API as compared to the second API.

At block 535, a fourth set of processing may be derived by applying comparable differences to those observed in the block 530 to the second set of processing to yield the fourth set of processing. For example, the API mashup generator may modify the lines of code of the second set of processing in a similar or comparable manner to the differences observed between the first set of processing and the third set of processing. In these and other embodiments, the API mashup generator may apply differences such that after applying the fourth set of processing to the second output, the data format and/or the data type may be the same as after applying the third set of processing to the first output.

At block 540, code from the third API call from the second software project, the generated code for the fourth set of processing from the block 535, and the fourth API call from the third software project may be combined into an API mashup. In these and other embodiments, the API mashup generator may convert the code from one software project into the programming language of the other software project such that the code of the API mashup is in a single programming language.

FIG. 6 illustrates a flowchart of an example method 600 of extracting metadata regarding an API, in accordance with one or more embodiments of the present disclosure.

At block 610, a description of a software project may be searched to identify the term "API" or synonyms of the term "API" (e.g., "third party service," "third party functionality," "retrieve," "fetch," etc.). For example, an API mashup generator (such as the API mashup generator 110 of FIG. 1) may perform a text search within the description for such terms.

At block 620, a determination may be made whether the term API (or a synonym thereof) identified in the block 610 is identified as introducing a new API or using an existing API. For example, the mashup generator may analyze the text of the description for certain phrases or certain words indicative that the API is new (e.g., "new API," "introduction to an API," "Source code of an API," etc.) or already existing (e.g., "use API1," "employing API1," a different entity than the entity hosting the software project, etc.). In these and other embodiments, a new API may be analyzed for potential identification of inputs, outputs, etc. for future use, but may or may not be analyzed for the purposes of generating API mashups.

At block 630, metadata for the API associated with the term API (or the synonym thereof identified at the block 610) may be extracted. For example, the API mashup generator may parse or crawl the description, the code, and/or the code snippets of the software project to extract a title of the API, a URL or URI where the API may be accessed, a host system for the API, one or more example usages of the API (which may include snippets of code in one or more programming languages), an installation guide for the API, or an API dependence between the API and another API, etc., or any combinations thereof. In some embodiments, the extracted metadata may be utilized to facilitate a determination of correlations between APIs and/or to facilitate generation of an API mashup. For example, an API title may be used to identify a correlation if a description indicates that one API (noted by title) may replace another API. As another example, the examples of usage of the API may provide portions of code (including in another programming language) that may be combined with other code by the API mashup generator. As another example, the API dependencies may be utilized to verify that the combination and/or order of APIs in the API mashup are configured property to compute.

Figure 7:
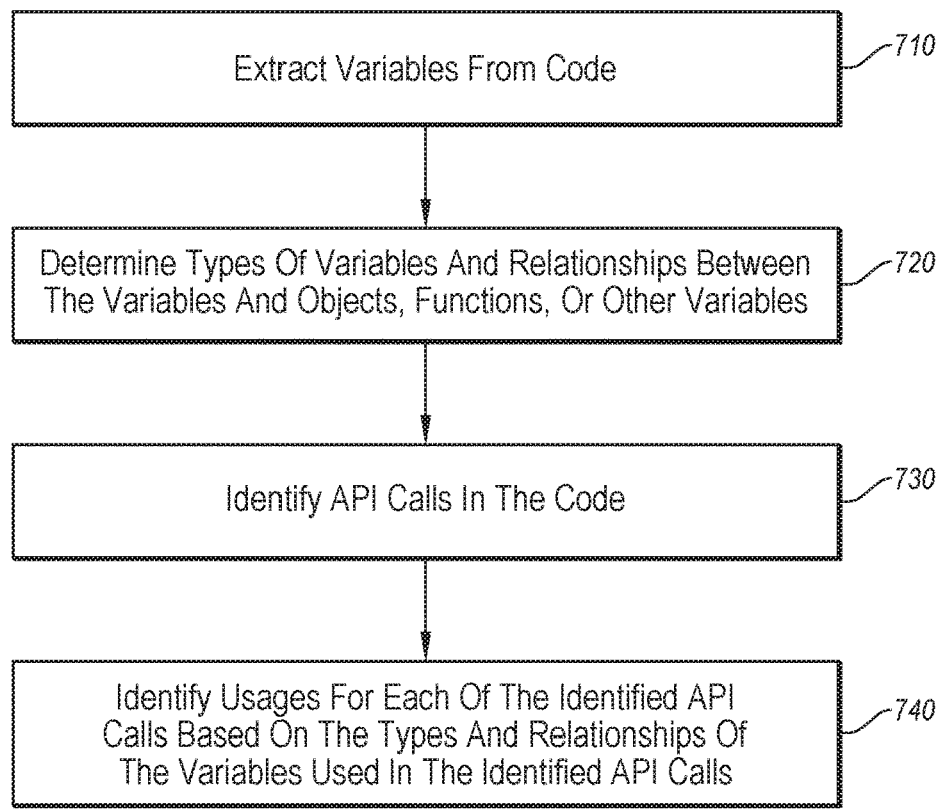
FIG. 7 illustrates a flowchart of an example method of analyzing code of an API.

In some embodiments, for those APIs identified as using existing APIs, the code associated with those APIs may be analyzed to identify correlations for use in API mashups, such as the method illustrated in FIG. 7 and/or the block 240 of FIG. 2.

FIG. 7 illustrates a flowchart of an example method 700 of analyzing code of an API, in accordance with one or more embodiments of the present disclosure.

At block 710, variables within code from a software project may be extracted. For example, an API mashup generator (such as the API mashup generator 110 of FIG. 1) may parse code from a software project that has been identified as using an existing API. The location of the variables within the code may also be observed when the variables are extracted. In some embodiments, the API mashup generator may determine what programming language is used in the code to facilitate the identification of variables within the code.

At block 720, a type of the variables may be determined. For example, the API mashup generator may identify the manner in which a variable is used in light of the programming language used to facilitate identification of a type for the extracted variables. In these and other embodiments, relationships between the variables and object, functions, or other variables may be determined. For example, the API mashup generator may identify a given variable in the code that is set as the same value as another variable (e.g., 'a=b'), one variable is subject to the same processing as another variable (e.g., 'a=a+1; b=a+2'), one variable is the output of a function (e.g., 'funct_a( )=b'), an objects is a variable or a sub-type of an object is a variable (e.g., 'obj_a=b; obj_a.sub_b=c'), etc.

At block 730, API calls in the code may be identified. For example, the API mashup generator may search the code for API calls identified previously, such as by identifying APIs within the description of a software project. As another example, the API mashup generator may search the code for patterns of known API calls, such as a PUSH, POST, DELETE, PUT, etc. HTTP command proximate a URL or a URI.

At block 740, usages for each of the identified API calls may be identified based on the types and relationships of the variables used in the identified API calls. For example, based on the code associated with the API call and the variable used, the API mashup generator may identify a usage for a given API call. In these and other embodiments, the usage of the API call may include how the API is called, the purpose for which the API call is used (e.g., to receive an image and output an array of emotions with corresponding scores), which variables are used as inputs/outputs for the API call, etc.

Figure 8:
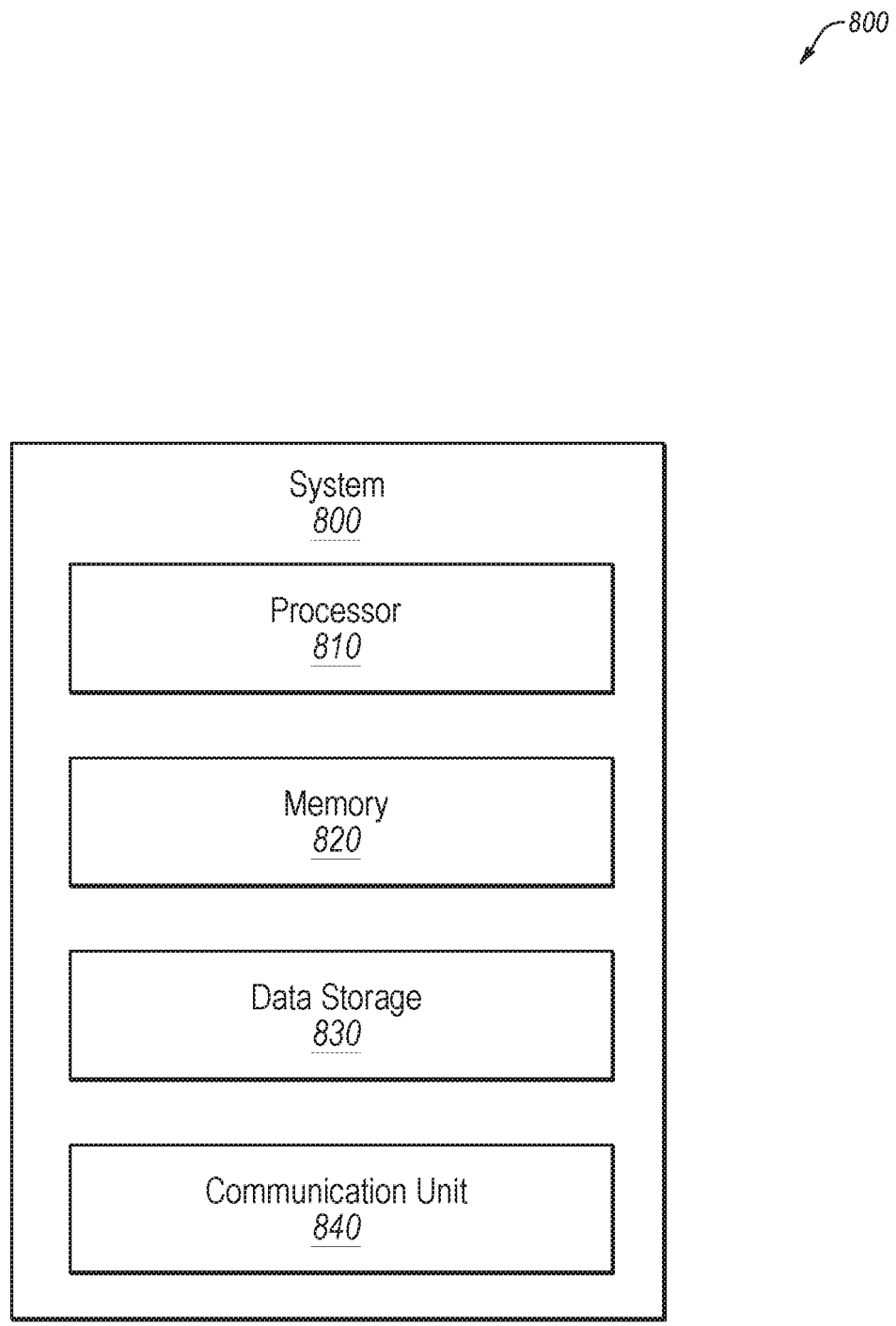
FIG. 8 illustrates an example computing system.

FIG. 8 illustrates an example computing system 800, according to at least one embodiment described in the present disclosure. The system 800 may include any suitable system, apparatus, or device configured to communicate over a network. The computing system 800 may include a processor 810, a memory 820, a data storage 830, and a communication unit 840, which all may be communicatively coupled. The data storage 830 may include various types of data, such as software projects, API documents, computer source code, etc.

Generally, the processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of network or physical locations that are configured to perform individually or collectively any number of operations described in the present disclosure. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory 820.

After the program instructions are loaded into the memory 820, the processor 810 may execute the program instructions, such as instructions to perform the methods 200, 300, 400, 500, 600, or 700 of FIGS. 2, 3, 4, 5, 6, and 7, respectively. For example, the processor 810 may obtain instructions regarding extracting information from various software projects, determining a correlation between two APIs, and compiling a machine-readable API mashup of two APIs.

The memory 820 and the data storage 830 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 810. In some embodiments, the computing system 600 may or may not include either of the memory 820 and the data storage 830.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 840 may include any component, device, system, or combination thereof that is configured to transmit or receive information over a network. In some embodiments, the communication unit 840 may communicate with other devices at other locations, the same location, or even other components within the same system. For example, the communication unit 840 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 840 may permit data to be exchanged with a network and/or any other devices or systems described in the present disclosure. For example, the communication unit 840 may allow the system 800 to communicate with other systems, such as computing devices and/or other networks.

Modifications, additions, or omissions may be made to the system 800 without departing from the scope of the present disclosure. For example, the data storage 830 may be multiple different storage mediums located in multiple locations and accessed by the processor 810 through a network.

As indicated above, the embodiments described in the present disclosure may include the use of a special purpose or general purpose computer (e.g., the processor 810 of FIG. 8) including various computer hardware or software modules, as discussed in greater detail below. Further, as indicated above, embodiments described in the present disclosure may be implemented using computer-readable media (e.g., the memory 820 or data storage 830 of FIG. 8) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    extracting information regarding a first software project based on source code of the first software project, the information including at least a description of the source code and computer-readable source code;
    identifying at least two application programming interface (API) calls invoking respective APIs within the information;
    extracting metadata regarding at least one of the APIs from the information;
    using the metadata, analyzing the computer-readable source code to determine a correlation between the at least two API calls, comprising:
        determining a first output of a first API of the at least two APIs; and
        determining a first set of processing of the first software project that occurs on the first output to yield a second input for a second API of the at least two APIs;
    determining a third output of a third API in a second software project;
    determining a second set of processing that occurs on the third output in the second software project to yield the second input for the second API;
    determining a third set of processing of a third software project that occurs on the first output to yield a fourth input for a fourth API;
    deriving a fourth set of processing by:
        observing differences between the first set of processing and the third set of processing; and
        applying the differences to the second set of processing to yield the fourth set of processing; and
    based on the correlation, generating computer source code that combines the third API call invoking the third API, the fourth set of processing, and the fourth API call invoking the fourth API in an API mashup.

2. The method of claim 1, wherein generating computer source code includes:
    detecting that the third API call is in a different programming language than the fourth API call; and
    converting the fourth API call into computer source code consistent with a programming language of the source code of the second software project.

3. The method of claim 1, wherein analyzing the computer-readable source code includes:
    determining a third input of the third API;
    determining that a fifth output of a fifth API in a fourth software project includes the third input; and
    wherein generating computer source code includes combining code from calling the fifth API and code from calling the third API into the API mashup.

4. The method of claim 1, wherein extracting metadata includes:
    searching the description to identify any strings of characters that include API or synonyms of API;
    determining whether the identified string of characters are associated with introducing new APIs or using existing APIs; and
    extracting at least one of an API title, an API uniform resource locator (URL), an API host, an example usage, an installation guide, or an API dependency from the description to facilitate the determination of the correlation.

5. The method of claim 4, wherein determining whether the identified string of characters are associated with introducing new APIs or using existing APIs includes one of searching a list of known APIs for a given API associated with the string of characters, or processing the description for terms identifying that the first software project source code is introducing the given API as source code of a new API.

6. The method of claim 1, wherein analyzing the computer-readable source code includes:
    extracting variables from the source code;
    determining types and relationships of the extracted variables; and
    identifying any API calls in the source code; and
    identifying usages for each of the identified API calls based on the types and relationships between variables used in the identified API calls; and
    wherein generating computer source code is based on the identified usages.

7. One or more non-transitory computer-readable media containing instructions, which, when executed by one or more processors, cause a system to perform operations, the operations comprising:
    extracting information regarding a first software project based on source code of the first software project, the information including at least a description of the source code and computer-readable source code;
    identifying at least two application programming interface (API) calls invoking respective APIs within the information;
    extracting metadata regarding at least one of the APIs from the information;
    using the metadata, analyzing the computer-readable source code to determine a correlation between the at least two API calls, comprising:
        determining a first output of a first API of the at least two APIs; and
        determining a first set of processing of the first software project that occurs on the first output to yield a second input for a second API of the at least two APIs;
    determining a third output of a third API in a second software project;
    determining a second set of processing that occurs on the third output in the second software project to yield the second input for the second API;
    determining a third set of processing of a third software project that occurs on the first output to yield a fourth input for a fourth API;
    deriving a fourth set of processing by:
        observing differences between the first set of processing and the third set of processing; and
    applying the differences to the second set of processing to yield the fourth set of processing; and
    based on the correlation, generating computer source code that combines the third API call invoking the third API, the fourth set of processing, and the fourth API call invoking the fourth API in an API mashup.

8. The computer-readable media of claim 7, wherein generating the computer source code includes:
    detecting that the third API call is in a different programming language than the fourth API call; and
    converting the fourth API call into computer source code consistent with a programming language of the source code of the second software project.

9. The computer-readable media of claim 7, wherein analyzing the computer-readable source code includes:
    determining a third input of the third API;
    determining that a fifth output of a fifth API in a fourth software project includes the third input; and wherein generating computer source code includes combining code from calling the fifth API and code from calling the third API into the API mashup.

10. The computer-readable media of claim 7, wherein extracting metadata includes:
   searching the description to identify any strings of characters that include API or synonyms of API;
   determining whether the identified string of characters are associated with introducing new APIs or using existing APIs; and
   extracting at least one of an API title, an API uniform resource locator (URL), an API host, an example usage, an installation guide, or an API dependency from the description.

11. The computer-readable media of claim 10, wherein determining whether the identified string of characters are associated with introducing new APIs or using existing APIs includes one of searching a list of known APIs for a given API associated with the string of characters, or processing the description for terms identifying that the first software project source code is introducing the given API as source code of a new API.

12. A system comprising:
   one or more processors; and
   one or more non-transitory computer-readable media containing instructions, which, when executed by the one or more processors, cause the system to perform operations, the operations comprising:
      extracting information regarding a first software project based on source code of the first software project, the information including at least a description of the source code and computer-readable source code;
      identifying at least two application programming interface (API) calls invoking respective APIs within the information;
      extracting metadata regarding at least one of the APIs from the information;
      using the metadata, analyzing the computer-readable source code to determine a correlation between the at least two API calls, comprising:
         determining a first output of a first API of the at least two APIs; and
         determining a first set of processing of the first software project that occurs on the first output to yield a second input for a second API of the at least two APIs;
      determining a third output of a third API in a second software project;
      determining a second set of processing that occurs on the third output in the second software project to yield the second input for the second API;
      determining a third set of processing of a third software project that occurs on the first output to yield a fourth input for a fourth API;
      deriving a fourth set of processing by:
         observing differences between the first set of processing and the third set of processing; and
         applying the differences to the second set of processing to yield the fourth set of processing; and
      based on the correlation, generating computer source code that combines the third API call invoking the third API, the fourth set of processing, and the fourth API call invoking the fourth API in an API mashup.

13. The system of claim 12, wherein generating the computer source code includes:
   detecting that the third API call is in a different programming language than the fourth API call; and
   converting the fourth API call into computer source code consistent with a programming language of the source code of the second software project.

14. The system of claim 12, wherein analyzing the computer-readable source code includes:
   determining a third input of the third API;
   determining that a fifth output of a fifth API in a fourth software project includes the third input; and
   wherein generating computer source code includes combining code from calling the fifth API and code from calling the third API into the API mashup.

* * * * *